(12) United States Patent
Boudville (10) Patent No.: US 10,672,066 B2
(45) Date of Patent: Jun. 2, 2020

(54) DIGITAL ASSISTANT INTERACTING WITH MOBILE DEVICES

(71) Applicant: Wesley John Boudville, Perth (AU)

(72) Inventor: Wesley John Boudville, Perth (AU)

( * ) Notice: Subject to any disclaimer, the term of this patent is extended or adjusted under 35 U.S.C. 154(b) by 486 days.

(21) Appl. No.: 15/530,733

(22) Filed: Feb. 23, 2017

(65) Prior Publication Data

US 2018/0240184 A1 Aug. 23, 2018

(51) Int. Cl.
| | |
|---|---|
| *G06Q 30/00* | (2012.01) |
| *G06Q 30/06* | (2012.01) |
| *H04L 29/08* | (2006.01) |
| *G06Q 10/08* | (2012.01) |
| *G06Q 20/32* | (2012.01) |
| *G06F 16/9535* | (2019.01) |
| *H04L 29/06* | (2006.01) |
| *H04W 4/80* | (2018.01) |

(52) U.S. Cl.
CPC ..... *G06Q 30/0643* (2013.01); *G06F 16/9535* (2019.01); *G06Q 10/087* (2013.01); *G06Q 20/322* (2013.01); *G06Q 30/0613* (2013.01); *H04L 67/02* (2013.01); *H04L 67/20* (2013.01); *H04L 67/38* (2013.01); *H04W 4/80* (2018.02)

(58) Field of Classification Search
None
See application file for complete search history.

(56) References Cited

U.S. PATENT DOCUMENTS

| | | | | |
|---|---|---|---|---|
| 7,912,755 | B2 * | 3/2011 | Perry | G06Q 30/02 705/26.61 |
| 8,353,773 | B2 * | 1/2013 | Sasaki | H04W 4/21 463/42 |
| 10,068,007 | B1 * | 9/2018 | Wohlsen | H04L 51/38 |
| 10,547,993 | B2 * | 1/2020 | Kuang | H04L 9/0861 |
| 2012/0084131 | A1 * | 4/2012 | Bergel | G06Q 20/40 705/14.26 |

(Continued)

OTHER PUBLICATIONS amazon.com; "Youtube Video Voice Shopping with Alexa"; Nov. 18, 2016; (https://www.youtube.com/watch?v=mCjvV3iFsuw) (Year: 2016).*

(Continued)

*Primary Examiner* — Naeem U Haq
*Assistant Examiner* — Norman Donald Sutch, Jr.

(57) ABSTRACT

A digital assistant ("Ann") interacts with the owner's mobile device. He sees a product on a third party website. If she sells it cheaper, he buys from her. Ann gets more business. A non-owner near Ann cannot buy directly from her. He says he wants to buy on his device. Ann says an URL. His device decodes and shows the page from Ann. He buys from it. Ann gets more business. A user near Ann asks to analyse a news page on his device. She advises if the page is real or "fake news". Two users with mobile devices near Ann use her to play a game, on website or app. A user uses a Virtual Reality device near Ann. He interacts with her via voice. She advises on what he sees and can do in the VR. Two digital assistants from different firms are near each other and a person with a mobile device. An assistant benchmarks itself against the other by passive and active means. Ann can have a barcode, that lets users pass information between her and their devices.

2 Claims, 10 Drawing Sheets

(56) References Cited

U.S. PATENT DOCUMENTS

| | | | |
|---|---|---|---|
| 2014/0245140 A1* | 8/2014 | Brown | G06Q 10/06 |
| | | | 715/708 |
| 2015/0363842 A1 | 12/2015 | Hoyne | |
| 2015/0379989 A1 | 12/2015 | Balasubramanian | |
| 2016/0037303 A1 | 2/2016 | Johnson | |
| 2016/0104188 A1* | 4/2016 | Glyman | G06Q 30/0234 |
| | | | 705/14.34 |
| 2016/0148305 A1 | 5/2016 | Gonzales | |
| 2016/0219137 A1 | 7/2016 | Louch | |
| 2017/0013070 A1* | 1/2017 | Comstock | H04L 67/146 |
| 2017/0177717 A1* | 6/2017 | Raniere | G06F 16/345 |

OTHER PUBLICATIONS

Aaron Souppouris; "Microsoft hopes Cortana will lead an army of chatbots to victory"; Mar. 30, 2016; engadget (Year: 2016).*

* cited by examiner

DIGITAL ASSISTANT INTERACTING WITH MOBILE DEVICES

REFERENCES CITED

Technical Field

The invention describes users with mobile devices interacting with a nearby digital assistant device.

BACKGROUND

Digital assistants have been made by several prominent technology firms. For example, Microsoft Corp. has Cortana™ Apple Corp. has Siri™ Amazon Corp. has Alexa™ While Google Corp. has Google Home. Some assistants currently run only on smartphones, while others also run on dedicated hardware. For example, Alexa runs on the Amazon devices Echo and Tap. Amazon sold 8 million Echoes in 2016. The Echo is the most common digital assistant to date.

Typically the devices are installed in a user's home. They usually lack a screen. A device might output sound and accept as input spoken commands from the user. The device is connected by wired or wireless means to a computer network (often the Internet), and through this network, to a server.

DETAILED DESCRIPTION OF THE PREFERRED EMBODIMENT

What we claim as new and desire to secure by letters patent is set forth in the following claims.

The submission primarily concerns the case where the digital assistant software runs on a hardware device and the latter is typically in a person's home. Though another scenario is where the device is in the person's workplace.

The submission has the following sections—
0] Classification;
1] Comparison shopping;
2] A visitor using the digital assistant;
3] Virtual Reality device;
4] Opinions;
5] Recommend a service or item;
6] Two users and a game;
7] Deep link;
8] Extensions;
9] Two digital assistants in proximity;
10] Barcode on a digital assistant;
11] Digital assistant for a social interaction;
0] Classification;

Most of this submission can be understood as 2 cases.

Case A. The user does something on his mobile device. He then interacts with the digital assistant. He needs to get information from his mobile device to the assistant. See Sections 1, 3 and 4.

Case B. The user interacts with the assistant by talking with it. He needs to get information from it to his mobile device. See Sections 2, 5, 6, 7 and 8.

For both cases, the problem is the air gap between the assistant and the mobile device. How to send information across the gap?

Section 9 falls outside either case. Section 10 covers both cases.

Figure 1:
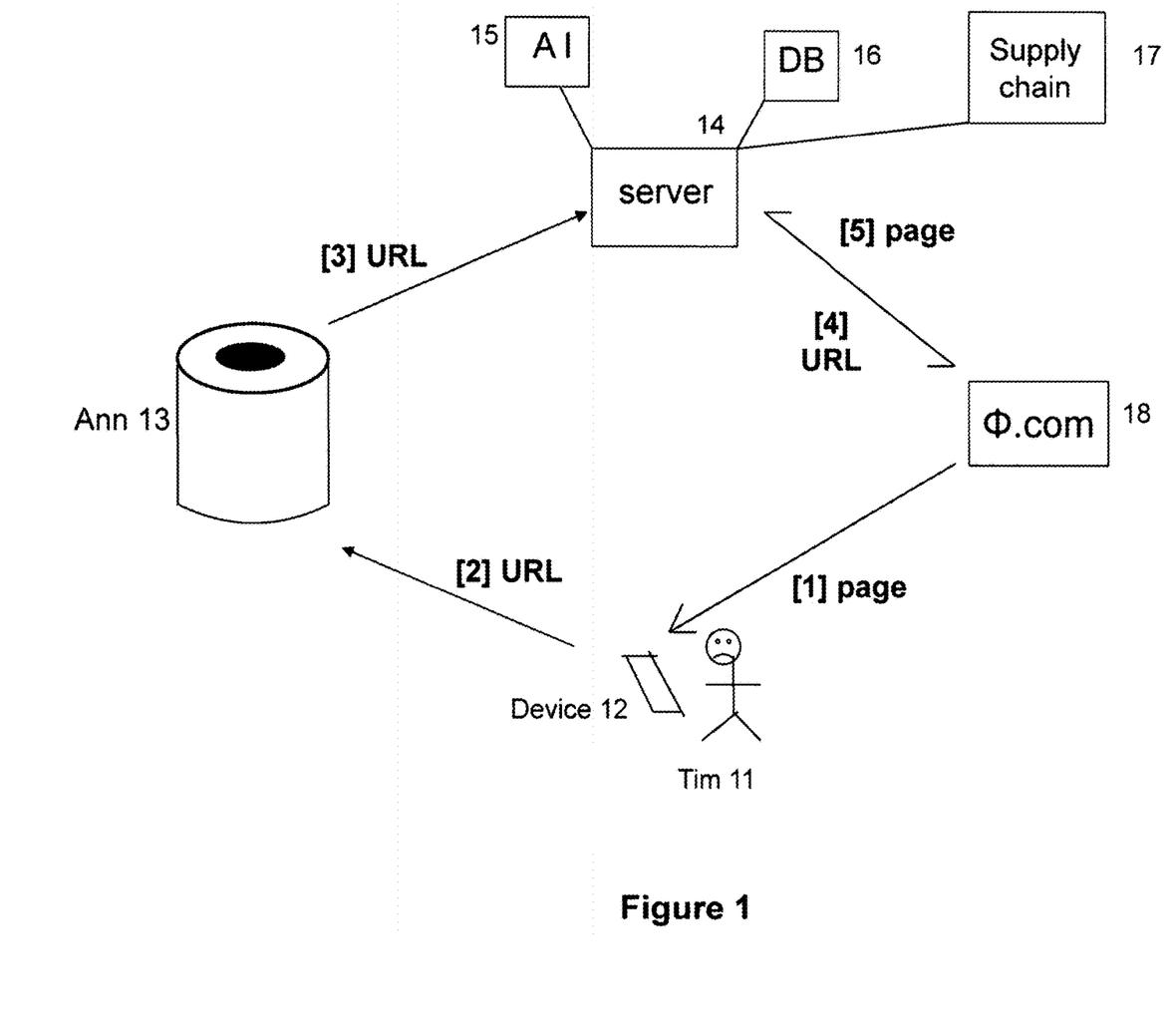
FIG. 1 shows a user with a mobile device near a digital assistant.

1] Comparison Shopping;

See FIG. 1. Tim 11 has a device 12. He is near a hardware digital assistant device Ann 13. In this submission, we use Ann to designate both the hardware device 13 and the software that runs on it. Ann is connected via wireless or wired means and a computer network to server 14. An instance of the network might be the Internet, where the connection could involve a telephone network. Server 14 can have components AI 15 and DB 16. AI 15 is an artificial intelligence system. DB 16 is a database.

Server 14 might exist in part to sell physical goods via a supply chain 17. The goods and possibly also services could be provided by the same company that owns server 14, or by affiliated partner companies or individuals. To this ends, Ann recognises Tim's spoken commands via Automatic Speech Recognition (ASR). The ASR runs locally on device 13 or possibly in tandem with programs on server 14.

This submission extends that mission by increasing the scenarios in which sales can be done by Ann (and her firm). Tim likely often carries his device 12 if it is a mobile device. On that device he looks at a webpage from website Phi.com 18. This is step [1] in FIG. 1. Suppose the page shows something for sale. Tim wonders if he should buy it. Being near Ann, he wants a quote from her on the item. Step [2] is where the URL of the page is wirelessly transmitted from device 12 to Ann. She (we use this female pronoun to refer to her) deciphers and sends the URL to server 14 in step [3].

How is the transmission from Tim and his device done? One way is for Tim to say each character in the URL, and expect Ann to correctly decode this. He would likely preface this with a command to Ann telling her to do so. But this is very awkward and error prone for Tim. A long URL is more manual work. And URLs are brittle. He must get each character right. If just one character in an URL is wrong, the entire URL would likely be invalid.

Figure 2:
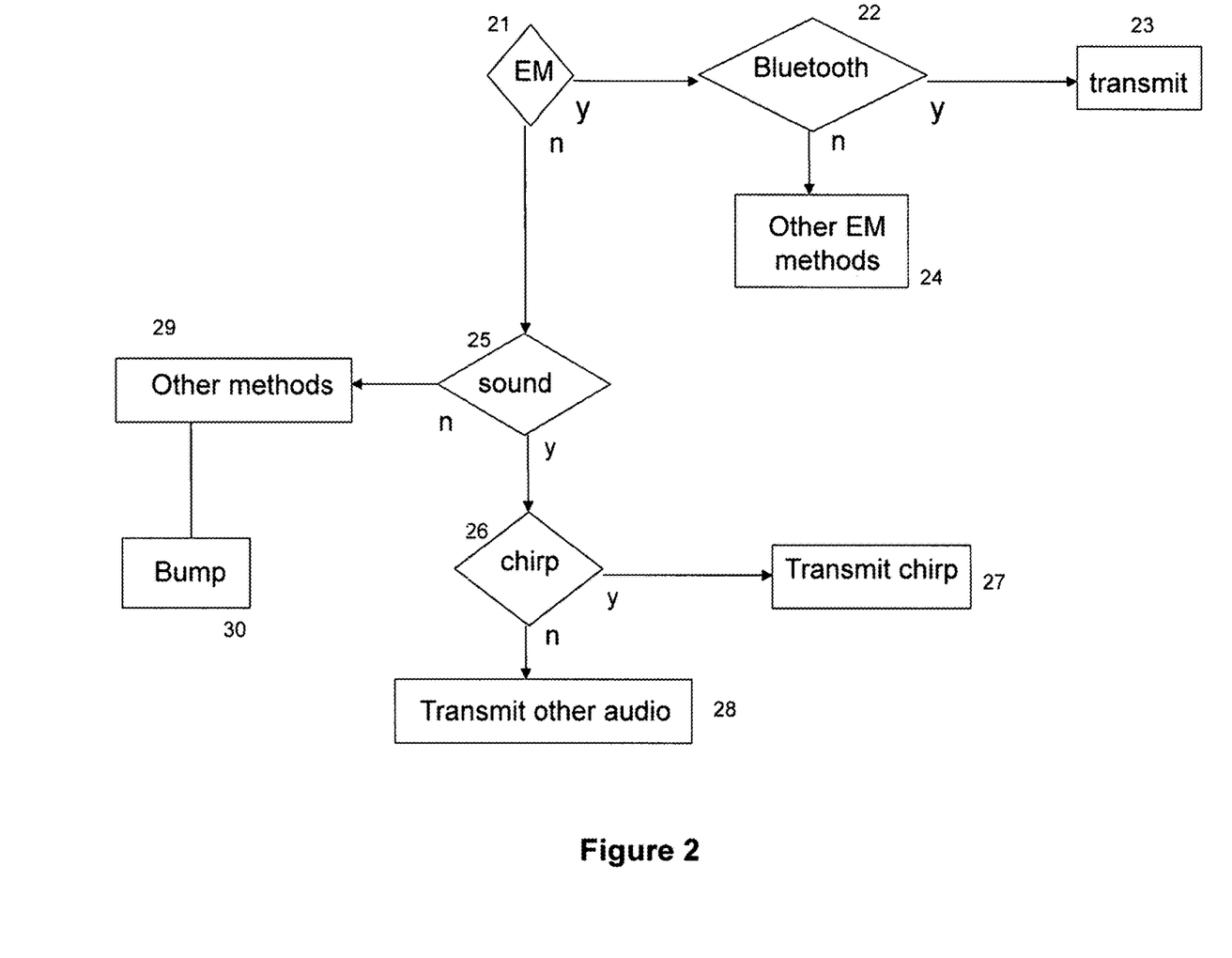
FIG. 2 is a flowchart of transmission between the devices.

FIG. 2 is a flow chart of how step [2] could be done by other means. Start at item 21. It is a decision to use electromagnetic (EM) radiation or not. If the answer is yes, we go to item 22. This asks if Bluetooth is used. If so, a Bluetooth transmission is made from Tim's device 11 to Ann in item 23. If device 11 is a cellphone, several types can transmit and receive Bluetooth. Of course, item 23 also needs Ann to be able to receive Bluetooth and that Tim knows this. If he owns and installed Ann, and Ann has Bluetooth, then it might be assumed that he has this knowledge. But if Bluetooth is not available, we go from item 22 to item 23, the use of other electromagnetic methods.

Item 21 also allows for non-electromagnetic means, leading to item 25. This asks whether sound is used. If yes, we go to item 26, which asks if a given type of sound transmission is used, "chirp". If yes, item 27 is performed, where a chirp is sent from Tim's device to Ann.

Chirp refers to an invention by Bergel and Steed at University College London, US application 20120084131. It involves transmitting not, for example, an URL itself, but a hash of the URL. Hashing has the property that a hash is of a length independent of the length of the input data. A chirp server is used, where the transmitting device sends the URL and gets a hash. The hash is played as audio. The receiver gets the audio, extracts the hash and sends it to the chirp server. The server replies with the original data.

If a chirp is not used in step 26 then we go to item 28, which uses other audio methods to transmit data. Likewise, backing up a step, in step 25, if sound is not used, then we go to item 29, which involves the use of other methods, non-electromagnetic and non-audio, to transmit data. There is at least one such method, Bump in item 30. It refers in part to US patent application 20110191823 and patent 8577292. Device 12 and Ann would be bumped together. The accelerometers in each (if they have these) would be used in conjunction with a bump server, to transmit data from device 12 to Ann via that server. (Roughly similar to how the chirp server is used.)

The gist of FIG. 2 is to show that there are various ways to get the URL of the page Tim is looking at on device 12 to Ann, across the air gap that separates the devices.

An alternative to the steps of FIG. 2 is for Tim to say the item's name to Ann, in a command for her to find a competitive price. He could also say the price. Ann might engage him in a conversation to help her identify the item and the website on which it appears. Through this she attempts to get to the page addressed by the URL, without getting the actual URL from him.

Returning to FIG. 1, server 14 sends the URL to Phi in step [4]. Phi sends a copy of the page to server 14 in step [5]. Now Server 14 and device 12 have the same page or very similar copies. The latter caveat can be for the case where a web server writes a unique id into each copy of an underlying page. Perhaps as the equivalent of a cookie or tracking mechanism. But essentially the visible portions of the copies are the same.

Server 14 parses the page. This can be done perhaps via using any XML information embedded in the page, where the XML tags have semantics about the content. Or a screen scraping can be done, where the HTML is parsed. The aim is to find information about the item for sale, assuming that the page shows such an item.

In general, Phi is not a business partner of Ann, but a competitor. It cannot be expected to cooperate. But even with screen scraping, server 14 is likely to be able to find product information and pricing. The page is directed to potential customers, so its author is incented to write text as clearly as possible. Plus for a product, there might be a Universal Product Code (UPC) or equivalent. If the product is a book, there could be an International Standard Book Number (ISBN). Another possibility is to find reference to a Stock Keeping Unit (SKU). Though the use of a SKU could be limited, as often different companies selling the same product might have different SKUs for it. Whereas a UPC is meant to be the same across firms.

Given that the server has an AI engine attached, there is high chance that the server can find any needed information.

There are other steps that the server can take. It gets Phi.com and sees if this is in a list of major retail sites. The server could have previously had persons analysing the pages of those sites and then encoding the page knowledge in the parser. A retail site that makes pages is likely to have very intricate and highly structured pages, and retain this structure over extended periods of time. Thus the server's encoded parsing knowledge can in turn be stable over such periods.

Suppose the server has to high confidence identified the item and its price on the Phi page. These are steps 31 and 32 in FIG. 3. The server checks in step 33 if it has the product in stock. If yes, we go to test 34. Is the server's price cheaper than Phi's price? If yes, item 35 is where the server instructs Ann to make an offer.

In terms of pricing, an option is for Ann to consider discounting her price of the item. Perhaps based on Tim's previous purchase history. Or perhaps as a loss leader, to induce Tim to make more purchases in the future. For simplicity, this decision logic is omitted from FIG. 3.

Figure 3:
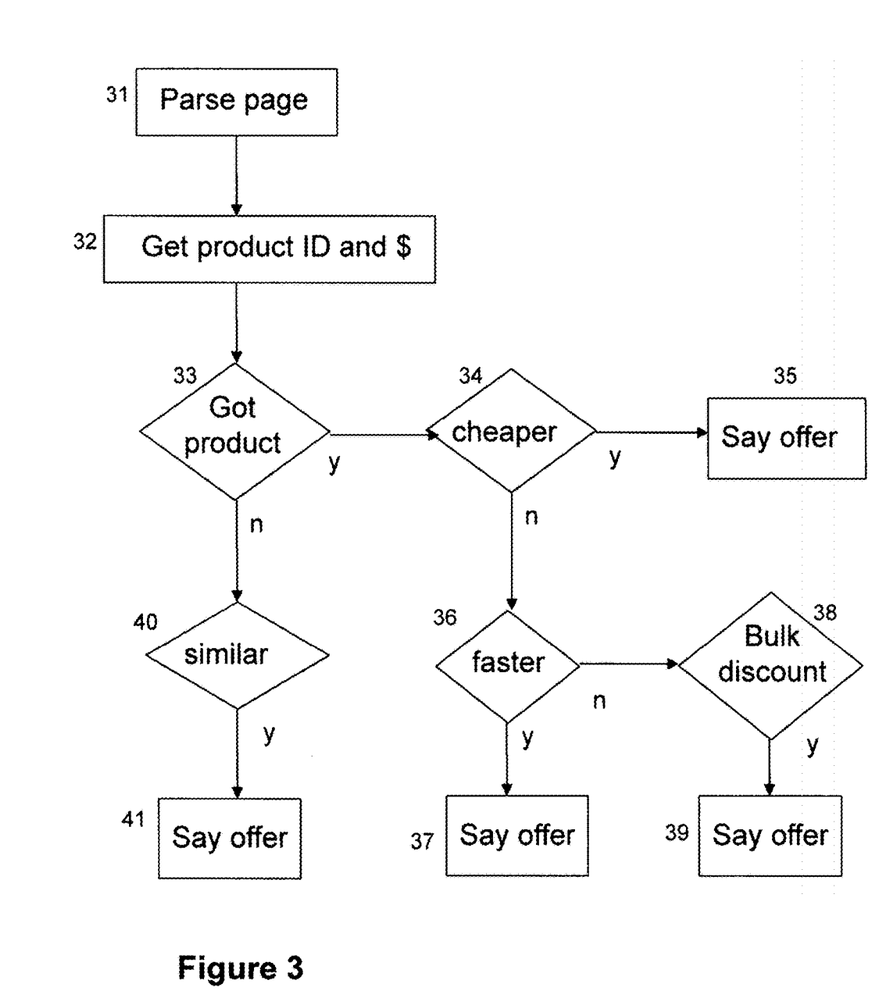
FIG. 3 is a flowchart of how the server analyses a webpage.

Suppose the server's price is more expensive. We go to test 36. Can the server offer faster delivery, as a competitive edge against Phi? How can the server know how long Phi would take to deliver? It could estimate, based on prior knowledge about Phi, external to the steps of this submission. And based also on knowing Tim's location. But even if the server is not sure, it could decide to say an offer, in item 37. It has a good estimate of how long it will take to deliver, so it could make an offer.

A variant is to consider where exactly Tim wants the item delivered. He might say to Ann the address if it is not his regular address (which is where Ann typically would be). Or Ann might ask for the address if it is not an address she already has in her database. One reason that the address can be different is if Tim is buying for someone else. A present, perhaps. Ann can use the new location and get an estimate of how long to deliver from warehouses associated with her. She might get an estimate for how long Phi will take. Whether or not Ann can delivery faster (and certainly if she can), she can make an offer to Tim.

Or from item 36 the server could go to a test in item 38. Even if it is not cheaper, it might offer a bulk discount to induce Tim to buy. The offer is in item 39.

What if the server does not have Phi's item in stock? We go to item 40. The server could use business intelligence to see if it has similar items in stock. If so, it does item 41, where it says an offer of one of those similar items.

The transition from item 40 to item 41 can be elaborated. Suppose the server has a similar item. There could be a test as to whether that similar item is cheaper than Phi's item. If so, Ann can make an offer, saying e.g. "I have a similar green jacket for $40 instead of Phi's jacket for $50". Likewise, a similar item could be compared on the basis of whether the server might deliver it faster to Tim than Phi can.

The order of the tests in FIG. 3 is simply one choice of those tests. A reordering of the tests is equivalent.

A variant is where the page at Phi on Tim's device 12 screen shows something that Phi is not selling. Phi might be a news site or a social media site. The page could have an image or text about some item. The image might be static or part of a video. Or the image could be static and the page also has an audio component. Tim gives the URL of the page to Ann as earlier, asking perhaps "Ann, do you sell this? How much?".

Ann's server gets a copy of the page and analyses it. Ann can use her AI and image and audio recognition means. She might ask Tim more questions to clarify if her identification of the item on the page is accurate. Or if there are several items, which one Tim is interested in. If she has the item in stock, she quotes a price to Tim.

One difference with the earlier case of Phi being a sales site is that here Ann does not have to discount against Phi's price, because there is none. But a disadvantage is that more computations have to be done to identify the item in the Phi page.

2] A Visitor Using the Digital Assistant;

Section one described the case of Tim who owned digital assistant Ann asking her for a price or product comparison with his phone page. When Tim installs Ann in his home (or work), he likely has to do several manual steps to calibrate Ann. Some of these simplify any purchases he makes via Ann. A basic problem is how to enter, say, his credit card information, or any other equivalent data that Ann needs for him to buy through her. He might protect this data with a password, so that others in the household or visitors cannot arbitrarily place orders using his account.

Figure 4:
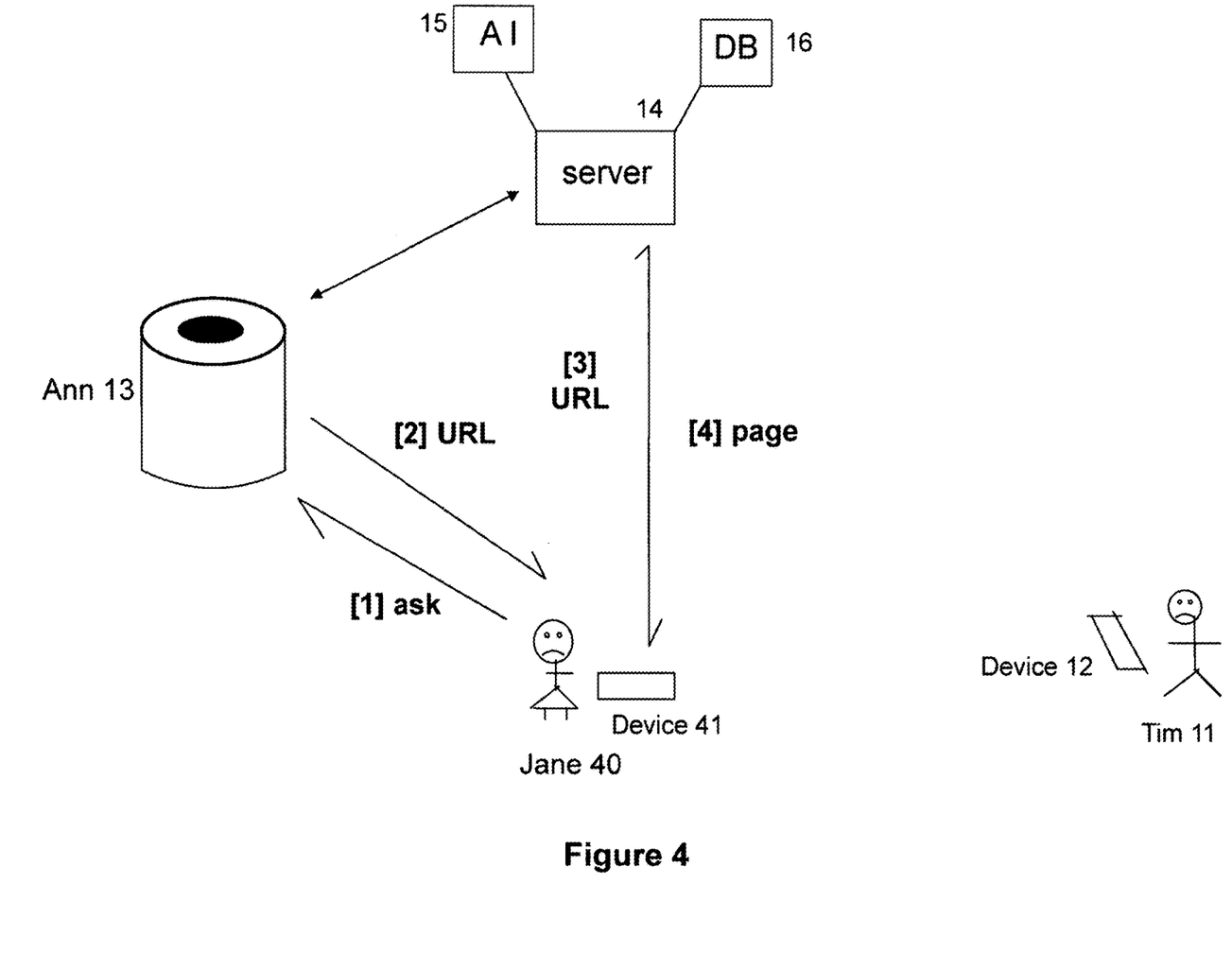
FIG. 4 shows a visitor with a mobile device near a digital assistant.

Now consider Jane 40 in FIG. 4, with her mobile device 41. She is near Ann 13. Jane might be another member of the household or a visitor. To Ann, Jane is lost business if Jane cannot buy through Ann. It is a utility of this submission and specifically of this section that Jane is able to do so.

Suppose Jane starts off by engaging Ann in conversation. Likely this will be possible by anyone near Ann. Jane can ask non-purchase questions like "What's tomorrow's weather?". But there is now a specific command that Jane says, like "Ann, I want to buy a dress on my phone". This is step [1] in FIG. 4.

Ann responds in step [2] by playing an audio of an URL. Before Jane did step [1], she started a program on her device to record this audio and convert it to an URL. The program then starts a mobile browser if it is not already running, and loads the URL. If the browser is running, the program loads the browser into a new tab or into the current visible tab.

A variant to steps [1] and [2] is where Jane does not have that program on her device. She might ask "Ann, I want to buy a dress". Ann replies "Do you know my password?". If Jane says no, Ann says "You can buy using your phone". Ann proceeds to tell Jane what program to check for or to install on her phone, to decode the URL that Ann wants to send her. The precise dialog can be flexible.

The URL points to server 14, which is now 2 types of servers. It acts as a server for Ann and as a web server. Jane's device sends the URL in step [3] to the server, which responds with a page in step [4]. Jane can now entirely use her device to navigate through the server catalog and presumably buy something.

There is an extra feature. Suppose Jane stays within range of Ann. The server sends audio to Ann and she says it, while perhaps guiding Jane through the server pages. Jane can just watch. Note that this is not necessarily the simple watching of a video on her device. The tour can be of different pages, where going from the first page to the second page involves the picking of a given link on the first page, and so on. Ann can speak while taking Jane through a sequence of pages on her device.

The playing of the spoken output from Ann can be in addition to the playing of any audio that is part of the pages. The spoken output is synchronised to the pages being shown on the device.

A variant is where the audio on some pages is turned off or turned down in volume, while the audio from Ann is played. This can lead to a different and distinctive user experience for Jane, compared to when she goes through the pages on her device, and not near the Ann applicance.

In most current browsers, the web server can of its own volition change the pages on a browser. Once the first page shows on Jane's phone, she could speak to Ann to navigate the pages on her phone. This minimises what Jane has to press on the phone.

Some users could find the verbal input from Ann to be useful and easier than just manually going through the pages. It extends and possibly improves the user experience of Ann's website.

The audio output by Ann that accompanies a page shown on Jane's device can be a combination of spoken and non-spoken audio (e.g. music). The spoken audio can be in a different voice than Ann's voice. This can help in retaining Jane's attention.

Purchases by Jane are made via her device.

Figure 5:
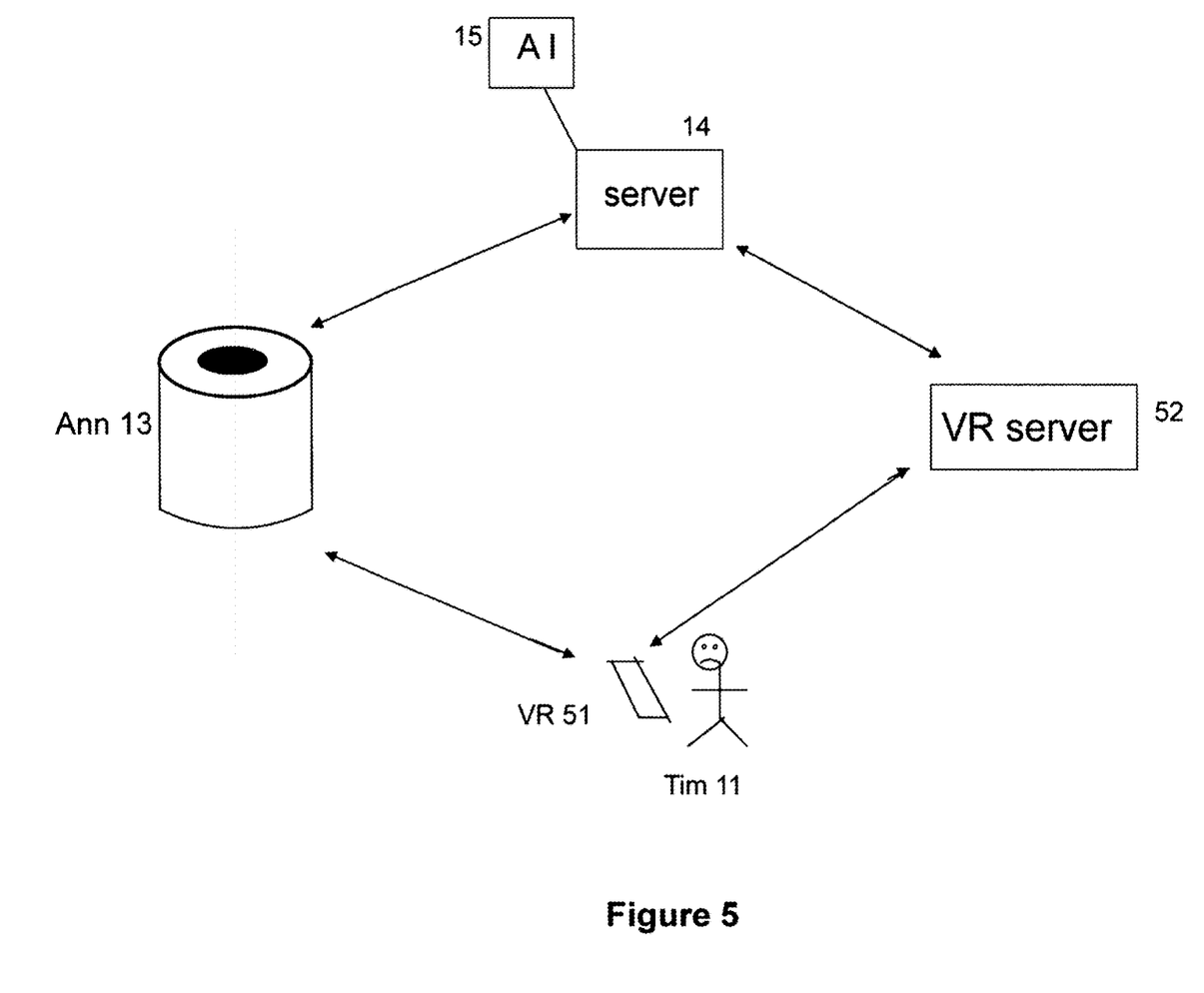
FIG. 5 shows a user with a VR device near a digital assistant.

3] Virtual Reality device;

Refer to FIG. 5. It is derived from FIG. 1. Tim's device VR 51 could be a Virtual Reality (VR) device. Tim runs a program on the device and it shows him some images in an immersive manner. And possibly also plays audio to him. The figure shows that the program on VR 51 has a server, VR server 52. This might be at a different location from VR 51, or it might be part of the hardware of VR 51.

Tim could tell VR 51 to play an audio encoding information about the program and where in the program he is. Ann gets this audio and decodes it to extract the information by a variant of the steps of Section 1. She sends it to her server, which deduces from prior knowledge what the program might be showing Tim. This could also involve the server sending queries to VR server 52, to get more information about Tim's interaction instance. This assumes that VR server 52 is accessible by server 14 via a computer network.

So for example, if Tim is in a three dimensional virtual world, Ann can get information about the objects near Tim. One example is that Tim is taking a tour of a real city, whose surroundings have been digitised and shown in VR.

Another configuration is where server 14 contacts directly the program running on VR 51.

In either case, Ann can act as an advisor to Tim as he interacts with the VR program. She speaks advice or remarks to him. Perhaps explaining what he sees or suggesting actions ("moves") he can take in the program.

A stronger variant is where Tim says commands to Ann, who then relays it to her server 14, which sends it to VR server 52. The latter might move Tim's character or avatar (if he has one) in the virtual world, or do other actions in that world. VR server 52 can also send data to Ann's server 14. She can give more advice to Tim.

This is a control or feedback loop, where Tim can now supplement his interactive abilities in the VR program with audio commands and getting audio input vis a vis Ann. It extends whatever default abilities he has to interact within device VR 51. To the firm making VR 51, this can expand the appeal of VR 51 if users could integrate it with a pre-existing digital assistant.

Ann can also sell to Tim within that VR program, if the program permits this. Often in conventional computer games, a game might try to upsell the player an item to be used in the game. A magic portion, a sword, extra ammunition etc. In some popular games, a side economy has arisen, where players in for example China might work full time playing the game, to accrue items. These are sold to players in the US, who save many hours needed to earn those items in their games.

Along these lines, Tim could ask Ann to find him some items he can use in the game. She searches online for a marketplace where the items can be bought. She finds prices of an item specified by Tim. She tells him the prices. If he agrees, she buys one for him. She might charge him a fee for this. Or if Ann's firm runs such a marketplace, it takes a commission.

While Ann's firm likely mostly sells physical items, some of these could be sold by third parties, and Ann never takes delivery. Some examples are eBay Corp. and Amazon Corp. Given this, there is no fundamental difference between Ann allowing third parties to sell physical items and them selling virtual items.

This action by Ann to search for a virtual item for Tim can be done even if her server 14 cannot or does not interact with VR server 52.

If Tim buys a virtual item via Ann, there would be some means by which he can then introduce or use the item in the program he is running on VR 51. The specifics depend on each program. But, assuming that the program permits users to transmit virtual items between themselves, this transmission can be done by passing an id of the item. In the context of some programs, there could be numerous manual steps done by Tim to buy and transfer the item. The program might have an API defined that lets other programs (like Ann) handle some or most of these steps.

4] Opinions;

Section 1 largely described a transactional scenario, where Tim does comparison shopping via Ann. But he might just want an opinion from Ann about the page he is currently looking at on his device 12. The steps in FIG. 1 and section 1 can be done. Though now he might say a different command to Ann prior to his device playing an audio encoding of the address of the page. The command might be something like "Ann, what do you think of this page on my phone?". Of course, there might be some short one word or phrase command definable by Ann or Tim that is the equivalent of the above Like "Ann, compare", where "compare" is the chosen keyword accelerator.

Based on his earlier interactions with Ann, she (and perhaps or likely using her AI) knows about some of Tim's habits and preferences. She can load that page by the steps described in section 1, and analyse it to discern any possible overlap with Tim's interests. The analysis of the page could include asking or accessing databases on the network that have analysed the page or more broadly the domain that hosts the page.

For example, suppose the page is a purported news article. A very topical problem in 2017 is fake news. Tim might not be sure about the reliability of what he is seeing. Whereas Ann can take the URL and consult authoritative sources on the network. This saves Tim some manual effort.

Ann might reply "Tim, the news article appears authentic". Or, "Tim, this is fake news".

While this might not be a transactional interaction, it offers the chance for Ann to be a valuable digital assistant and a sounding board for Tim. By Ann being a trustworthy advisor, it improves her credibility later, when she tries to sell items to him.

Another use case is where Tim wants a running commentary from Ann to accompany him watching a video on his device (mobile or non-mobile). Suppose the video is a movie and someone else, Dave, has produced a synchronised soundtrack to accompany the movie. Dave provides remarks at many places throughout the movie. Dave puts this online. Tim asks Ann to find such a commentary and play this in parallel to his playing of the video. He perhaps cannot do this on his device, because the speaker on his device is dedicated to playing the soundtrack of the movie.

One precedent is Mystery Science Theatre 3 Thousand (MST3K). The editors made a video set in a movie theatre. A B grade movie was shown on the theatre screen. In the foreground were profiles in shadow of 2 or 3 movie patrons. One was the 'hero'. The others were aliens. The point was a script overlaid on the original script of the movie. The new script had the characters ad libbing at numerous points in the movie.

A related use case is a sporting event. Either live or recorded. Perhaps Tim does not like the commentary that comes with the event. For example, the commentary might be in Spanish, and Tim prefers English. He asks Ann to find a commentary for the event, with preferences like the language. Or perhaps he wants a commentary by a favorite sports personality. Ann finds this and plays it, while Tim watches on his device.

5] Recommend a Service or Item;

This Section continues Section 2. See FIG. 6. It shows Tim 11 with his device 12 near Ann 13. Suppose his device is a phone. He registers his phone number with Ann. Or he might also register his email address with her. In general, if he does either, each is only done once or infrequently. His phone number and email address can be assumed to rarely change.

Tim says, "Ann, who do you recommend for car insurance?". This is step [1] in FIG. 6. Ann sends this to her server 14. The server might have a list of several car insurers and it picks one from this list. One way to do so is via an auction, like a Real Time Bidding (RTB) auction. Some profile of Tim is presented to the computer programs of each insurer. They rapidly analyse the profile. Each comes up with an amount it is willing to pay Ann, based on his perceived value, which will differ across insurers. Ann's server could then pick the insurer offering, say, the highest amount.

Variants are possible. For example, instead of a real time process that uses data about Tim, the server might at an earlier time put out to auction the phrase "car insurance". The insurers offered amounts to be presented as the result to users.

This example assumes that the service being provided is not provided by Ann's server, but by third parties.

By whatever means, Ann's server has picked an insurer. Assume that the result will be an URL of the insurer's website. The server sends this in step [2] of FIG. 6 to Tim's device. This can be in the form of an Instant Message (IM) or text message. Or an email. These are considered functionally equivalent in the context of this submission. In parallel with her server sending the message to Tim's device, Ann can say, for example, "Tim, check your device. I just sent you info." For brevity, this action is omitted from FIG. 6.

Tim reads the IM or email on his device. If he clicks the URL in the message, his mobile browser will load the page.

A variant is where his device runs a process (=a program). It scans incoming IM or it consults his email provider. If a message comes from Ann's phone number or email address, the process examines the contents. If this contains an URL, the process loads it into the browser. At this point Tim becomes aware of it. This reduces the cognitive load and manual steps for him.

Figure 6:
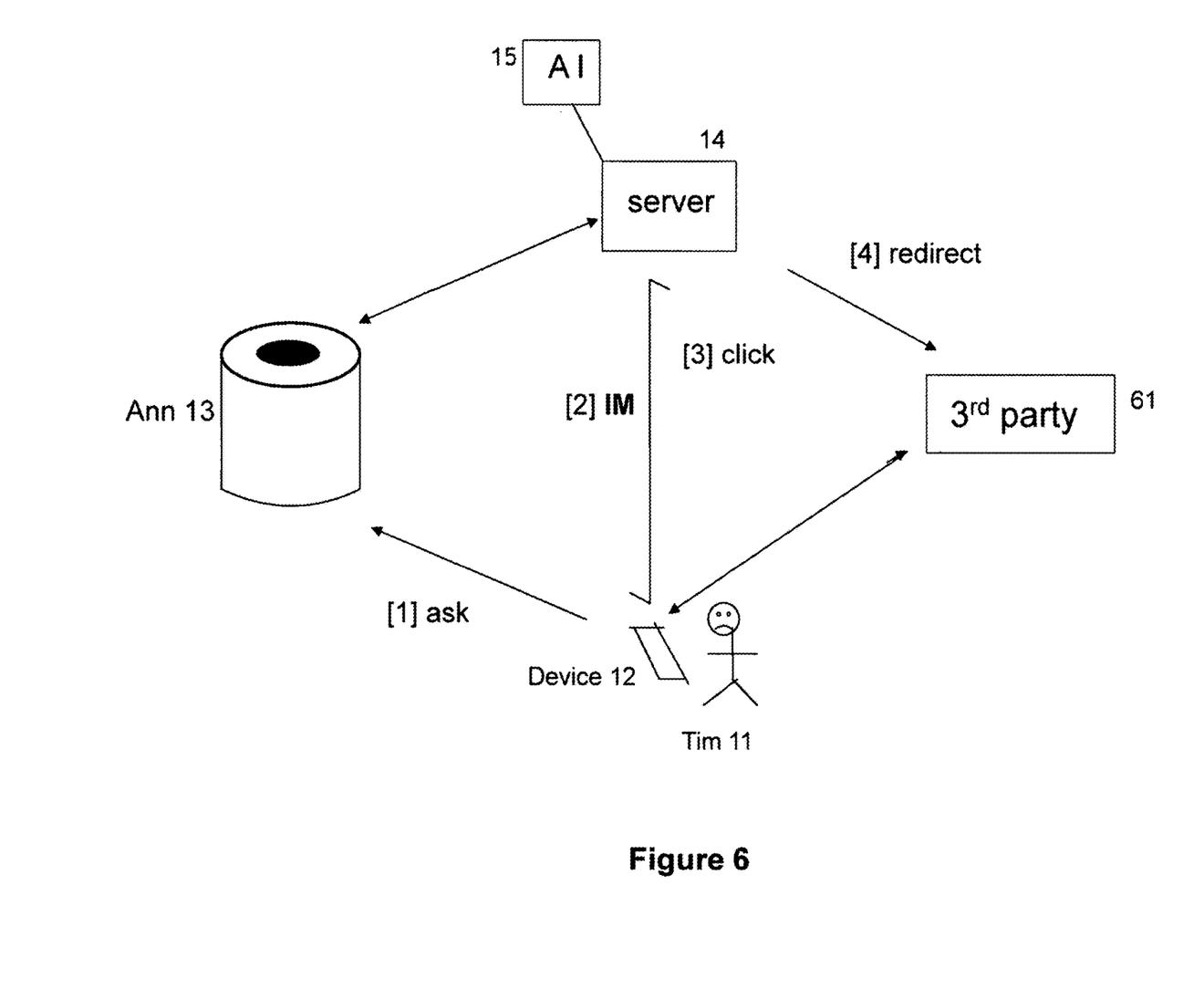
FIG. 6 shows a user asking the assistant for a recommendation.

The URL could directly refer to the third party site. Or it has a domain of Ann's server. If Tim picks the URL, this goes to the server in step [3], which then redirects to the actual third party site 61. This is step [4]. The redirection is done by the server perhaps to ensure that it gets paid by the advertiser.

This section looked at Tim, who might be considered to be the owner of Ann. Suppose instead of Tim in FIG. 6, there is Jane, a visitor. The methods of the section can still be applied, if Ann lets non-owners also ask for recommendations from her. She can let visitors like Jane register their electronic addresses. This is possible because Jane is not buying via Ann and using Tim's account. Any action Jane takes with a webpage she gets from Ann is with her own financial account.

Figure 7:
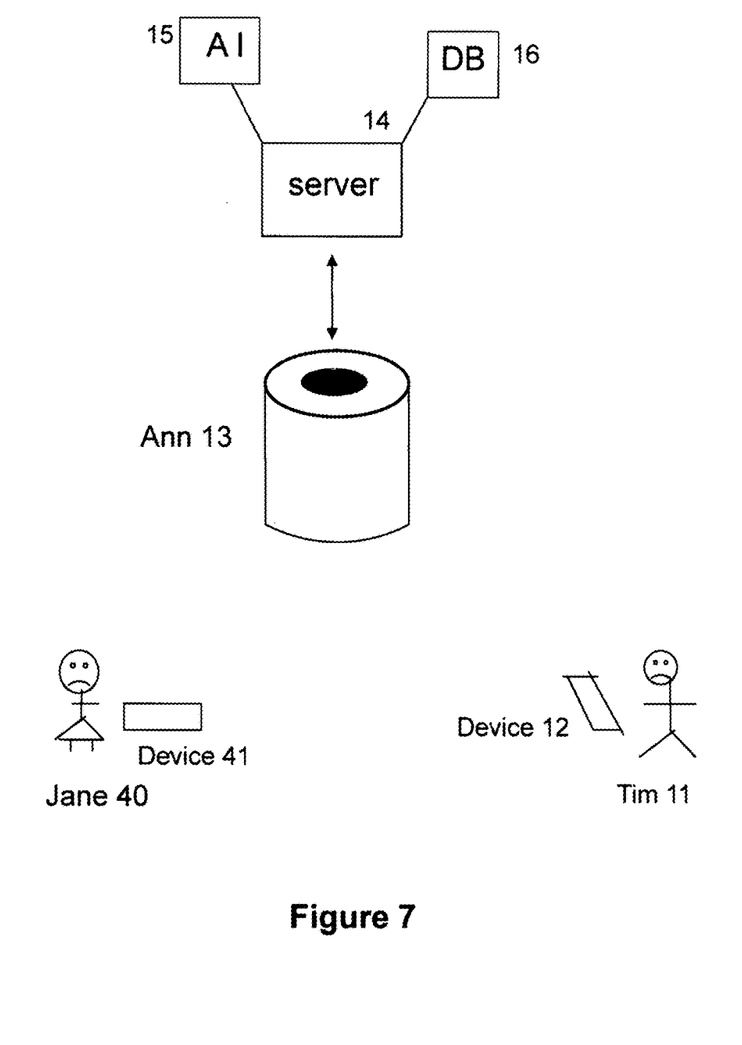
FIG. 7 shows 2 users with mobile devices near a digital assistant.

6] Two Users and a Game;

See FIG. 7. It shows users Jane 40 and Tim 11 near the digital assistant Ann 13. Jane has her device 41 and Tim has his device 12. They want to play a 2 person game on their devices. Suppose for simplicity that the game is played on a browser. Jane and Tim could speak to each other and decide on a game, chess, say. Jane says to Ann, "Ann, Tim and I want to play chess on our phones."

Ann finds a website that lets users play the same game of chess. She plays an audio encoding of the URL of the game. This can use the steps of Section 1 and FIG. 2. Jane and Tim get the audio on their devices. The devices decode the audio. Each device brings up a webpage with the URL. The page can have an option to let one of them pick white or black, or it may have an option to randomly assign to Jane and Tim.

The point about these steps is that the digital assistant can assist people nearby in finding and starting a multiplayer interaction. It saves several manual and error prone steps at the start. Where Jane and Tim might have to separately or jointly search for a site hosting the game. Then typically for a web game, one player starts an instance of the game. Assume this is Jane. She appears in a lobby page of the website, under some nickname. Tim has to manually go to the website, find and click to get to the lobby. In that page, he searches for Jane's nickname. If the game is popular, the lobby could have hundreds of players waiting for Tim. So he has cognitive load in searching the lobby. When he finds Jane's nickname, he clicks it. This starts his browser page as the other player in Jane's game instance.

Given the steps outlined in the previous paragraph, the reader can appreciate the utility of appliance Ann handling many of those steps.

A variant is where Ann finds several chess websites. She can pick one to present to Jane and Tim. Perhaps a website they previously used. (Ann kept a record of this.) Or perhaps a website that Ann thinks is the closest to them, to reduce the latency (delay) in the game experience.

The above referred to Ann broadcasting an URL of the game. The URL might first go to Ann's server. If the server gets the URL, which means one of Tim or Jane clicked it, then it redirects to the actual website of the game. The server can use the redirection to bill the website for the referral (clickthrough) it just sent.

A variant is where the server bills the website only if it gets 2 clickthroughs, from Jane and Tim's devices. The point is that if only 1 person ends up clicking on a 2 person game, then the game is not played. This gives some protection to the game website, for it only pays for an actual playing of its game.

This section referred to the playing of a game. In general, it can be any 2 person interaction.

7] Deep Link;

The previous section treated the game of a browser game. What if the game is an app? This can also be handled via a method of using a deep link. A deep link can be understood as akin to an URL. One type of deep link can be represented as appId://networkAddress The appId is an identifier of the game app in an app store. For the hardware family corresponding to a given app store, the appId uniquely points to the app executable that can be downloaded to a device.

The networkAddress is the Internet Protocol address in IPv4 or IPv6 notation of an instance of the app.

Jane or Tim might instruct Ann to find a chess app, instead of a chess website. Ann finds such an app, with the following property. Ann plays audio of an encoding of the app id. Jane, say, has her device decode it. Then her device installs the app from the app store. Her device can be preset to then automatically run the app. Or she might manually run the app. Her instance of the app listens on a port on the Internet. This assumes that her device is on the Internet. Her device finds her temporary Internet address. It uses this to make the above deep link. This is encoded and played as audio by her device.

Tim's device decodes the audio to get the deep link. It uses the app id in the deep link to install the game and start up. His instance of the game is started by his device and given Jane's IP address. His instance connects to her instance.

Thus with minimum manual effort by both users, they can play a two person game app.

In the above, for Jane and Tim, before a device goes to the app store to start the download, it first checks if the app is already present. If so, the app is started.

This section chose the example of the interaction being a game. In general, the interaction could be a non-game. Perhaps a collaborative electronic whiteboard, for example.

8] Extensions;

Earlier sections described a user with a mobile device. But the methods of the sections can be extended to where the device is non-mobile. Like a personal computer. In the context where the user or owner of the PC has a digital assistant within earshot.

Section 1 started with the scenario where Tim is already looking at a page on his mobile device and he asks Ann for a comparison. A different scenario is where he has his mobile device, but he starts by interacting with Ann in the conventional way. Purely voice. He might ask her for something he is interested in buying. She tells him via her spoken output. He wants more information. He has not yet decided to buy. Ann can suggest, "Tim, can I send a picture of it to your phone?". Or the suggestion comes from Tim, "Ann, send a picture of it to my phone".

In either case, the point is that Ann wants to close the deal. She uses the likelihood that Tim has his mobile device nearby to give him extra information to sway him. This gets around the disadvantage of Ann—low bandwidth and lack of visuals. The steps in section 2 and FIG. 4 are then done, where Tim is in the place of Jane in that description. Ann plays an audio encoding an URL. Tim runs a program in his mobile device to decode the URL and load it into a browser. The URL points to Ann's server.

Or if Ann knows his phone number or email address, she might send him the URL in an electronic message. As discussed earlier, he could have a program that detects the message and loads the URL.

The page on Tim's device is not limited to showing a static image. There can be written data. And video might be used.

The page can be optimised for a mobile device with a small screen. Often a website might have 2 versions of pages. One for a PC and one for a small mobile screen. Ann can suppose or she is told by Tim that his device is a small device. So by default, the URL she sends is for a mobile page.

If Tim decides to buy, the purchase could be done via a spoken instruction to Ann or via the page.

Figure 8:
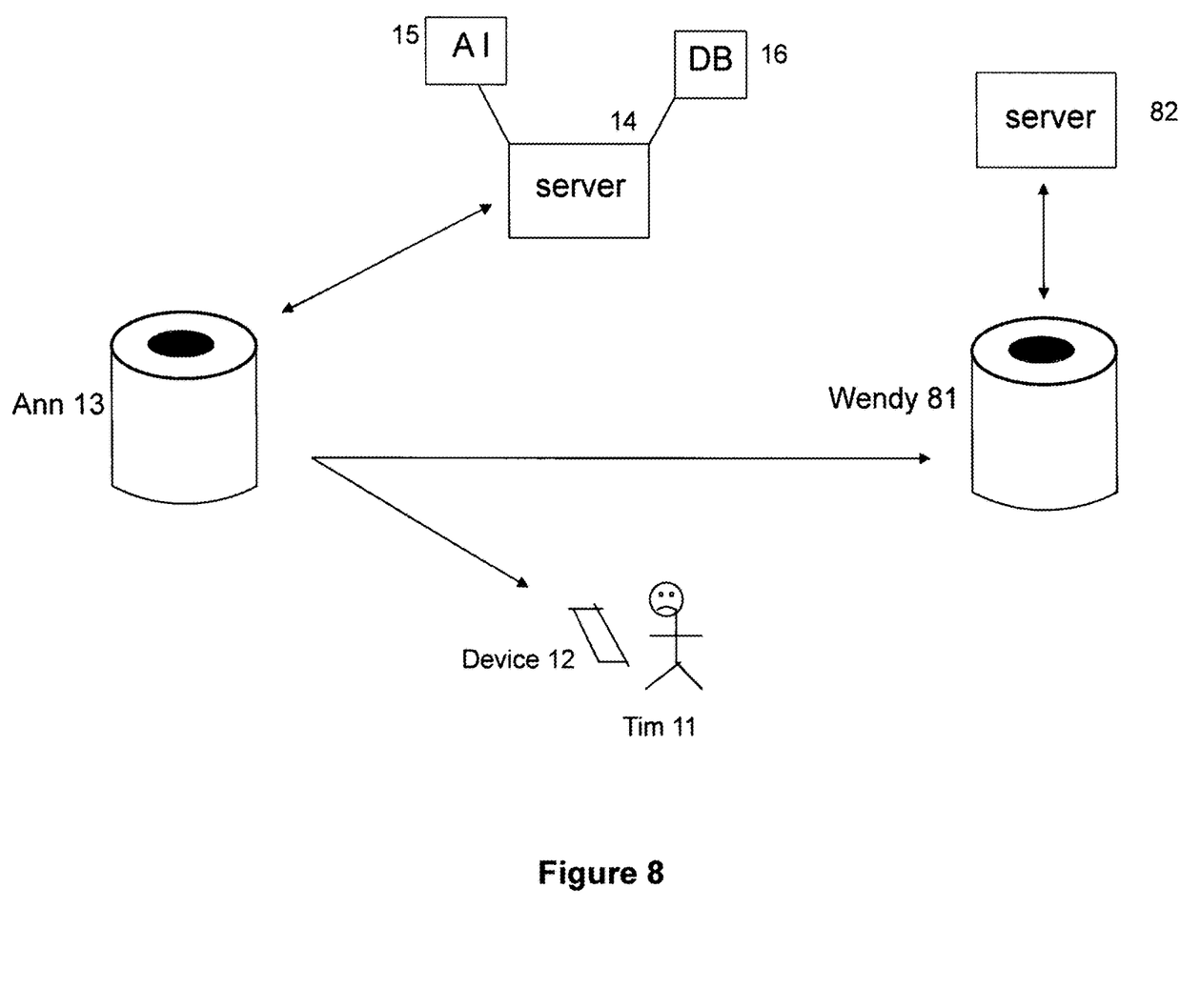
FIG. 8 shows a user near 2 digital assistants.

9] 2 Digital Assistants in Proximity;

See FIG. 8. This depicts Tim 11 near digital assistant Ann 13 as before. But now there is another digital assistant Wendy 81 nearby. She is connected to her server 82. Wendy is made by a different company than Ann's.

Tim interacts via voice with Ann. He gets advice on an item she is selling. He wants a competing offer from Wendy. One method is that if Wendy is always on, she listens to the conversation between Tim and Ann. She parses this, detects that an item is being offered by Ann. She tries to identify the item and perhaps also Ann's price. If Wendy has the item in stock, she might initiate a conversation with Tim, with a competing offer.

Or Tim could ask Wendy to be ready to get an audio about an item for sale by Ann. He asks Ann to send to his device 12 an URL with more data on the item, as per the previous section. Ann sends it via audio, as shown by the arrow from Ann to device 12 in FIG. 8. But Wendy also gets the audio. This is possible if Ann's speaker broadcasts to a large solid angle. In general, Ann will be configured this way, to maximise the usefulness. The arrow from Ann to Wendy in FIG. 8 shows Wendy getting the audio. Plus Tim could have placed Ann and Wendy in such a way that this is possible, and also the reverse, of Ann being able to record Wendy's audio.

Just as Tim's device might be able to decode the audio and show the URL's page, so can Wendy decode Ann's audio and get the URL. She sends it to her server, which then loads and parses the page to see if it can offer the same or similar product at a competitive price. If so, Wendy says this to Tim. Or she can send an electronic message to an electronic address of Tim's, that he has earlier told her.

A different way for Wendy to get Ann's offer is via Tim. Suppose Ann sends a URL to Tim's electronic address. Tim has pre-recorded Wendy's electronic address (phone number or email). It is straightforward for Tim to forward the electronic message he got from Ann to Wendy. The context of Ann's message can be pre-written into the forwarding message—for example, "Tim wants a quote from Wendy" in the subject line.

Escalation is possible. Suppose Wendy makes an offer to Tim by speaking it. Ann is still on by assumption. She listens and decodes Wendy's offer. Ann knows the offer she just made to Tim. She uses this context to deduce that Wendy's offer refers to her offer. Ann can decide to make a counter-offer to Wendy. Emphasising some aspect of this presumably superior to what Wendy offers.

Iteration is possible if Ann verbalises the offer. Wendy listens and might make a counteroffer.

A digital assistant in proximity to a competing digital assistant can use this to do market analysis. One method is strictly passive. Consider Ann. When she is on (which might be the default case), she is listening to possible commands from Tim or other humans. She can use this to detect if another digital assistant is nearby. From the conversations, she can try to deduce if some are commands aim"ed at a nearby digital assistant. For example, suppose that Wendy's firm uses the spoken word "Wendy" as the keyword. If Ann keeps hearing phrases that have "Wendy" and if the rest of the phrases appear to be commands, then it strongly suggests that a Wendy is near Ann.

But the Wendy firm could let a Wendy owner change the command keyword (or phrase) to something else. Likely if Tim says several commands to Wendy using a non-default keyword, that Ann can soon deduce that some digital assistant is near her. Even if Ann cannot pinpoint which firm's assistant, this can be useful in itself.

Another means of deducing which firm's digital assistant is near is by Ann recording the audio that appears to be output by that assistant. The spectral properties of the audio likely may suffice to tell Ann which firm. There are unlikely to be a plethora of firms, so the analysis can be easy.

Ann, having identified Wendy's presence and Wendy's firm, can do more analysis. For example, Ann can find which items Tim bought from Wendy. These divide into cases where Ann was asked and where she was not asked.

For the cases where both assistants were asked, and a purchase made from Wendy, Ann can store data for her firm to understand why. In some cases, Wendy had lower prices. Ann's firm can decide whether it wants to match those prices in future or not. In other cases, Wendy had an item in stock and Ann did not. Ann's firm can consider whether it is cost effective or desirable to stock those items. Perhaps the items are too low margin for Ann's firm, so it will relinquish any future purchases of those to Wendy.

Ann can study the cases where Tim bought from her instead of Wendy. Was Ann cheaper in some items? If so, it is obvious why Tim likely bought from her. But was Wendy cheaper and Tim still bought from Ann? Could Ann deliver faster?

The purchases give insight into Tim's preferences. Over enough clients, Ann can look for correlates of behavior, to predict Tim's future purchases. For example, does Tim direct only certain types of questions to Ann, and other types to Wendy? If so, does this suggest that he considers Ann better or more reliable on some subjects and Wendy on others? Ann wants Tim to consider her an authority on many subjects. Because on those subjects, she might be better able to upsell him on any related products or services offered by her or her partner firms. For subjects that Tim thinks Wendy is better, Ann's firm can do more intensive analysis on why.

All these examples are where Ann does a passive analysis of the conversations she records. She can also do active analysis. During a period of the day when no commands are expected from humans, Ann can ask Wendy questions. These could be non-purchase questions. Where Ann (which also means her server) might already know the answers. Ann can compare the (presumably) right answers she has against Wendy's answers. To test the efficacy of Wendy's database.

Ann can test how long Wendy takes to reply, compared to how long she would. This could be a combined measure of how quickly and accurately Wendy can do Automatic Speech Recognition (ASR), as well as the speed of Wendy's querying of her database.

Ann can vary the voices she uses to ask Wendy. One voice might mimic Tim's. Does Wendy's ASR better detect Tim's voice? In general, an ASR can have many parameters. Perhaps Ann's ASR can be adjusted to better recognise what Tim says.

All of these show how Ann can benchmark against her competitors in actual field deployments. Thus while having 2 digital assistants near each other and competing for the customer's business may be a race to the bottom, a firm can still derive useful market understanding.

10] Barcode on a Digital Assistant;

Section 0 described the basic problem. There is an air gap between the digital assistant Ann and a nearby (mobile) device. How to cross the air gap? One answer is to put a barcode on the digital assistant. If the assistant does not have a digital screen, then the barcode needs to be a hardcopy printed barcode. The barcode can be one or two dimensional. If two dimensional, it can be in any common format, like QR or Data Matrix.

Consider case B from Section 0. A user, Jane, interacts with Ann by talking with Ann. This is the standard default way that Ann is used.

Figure 9:
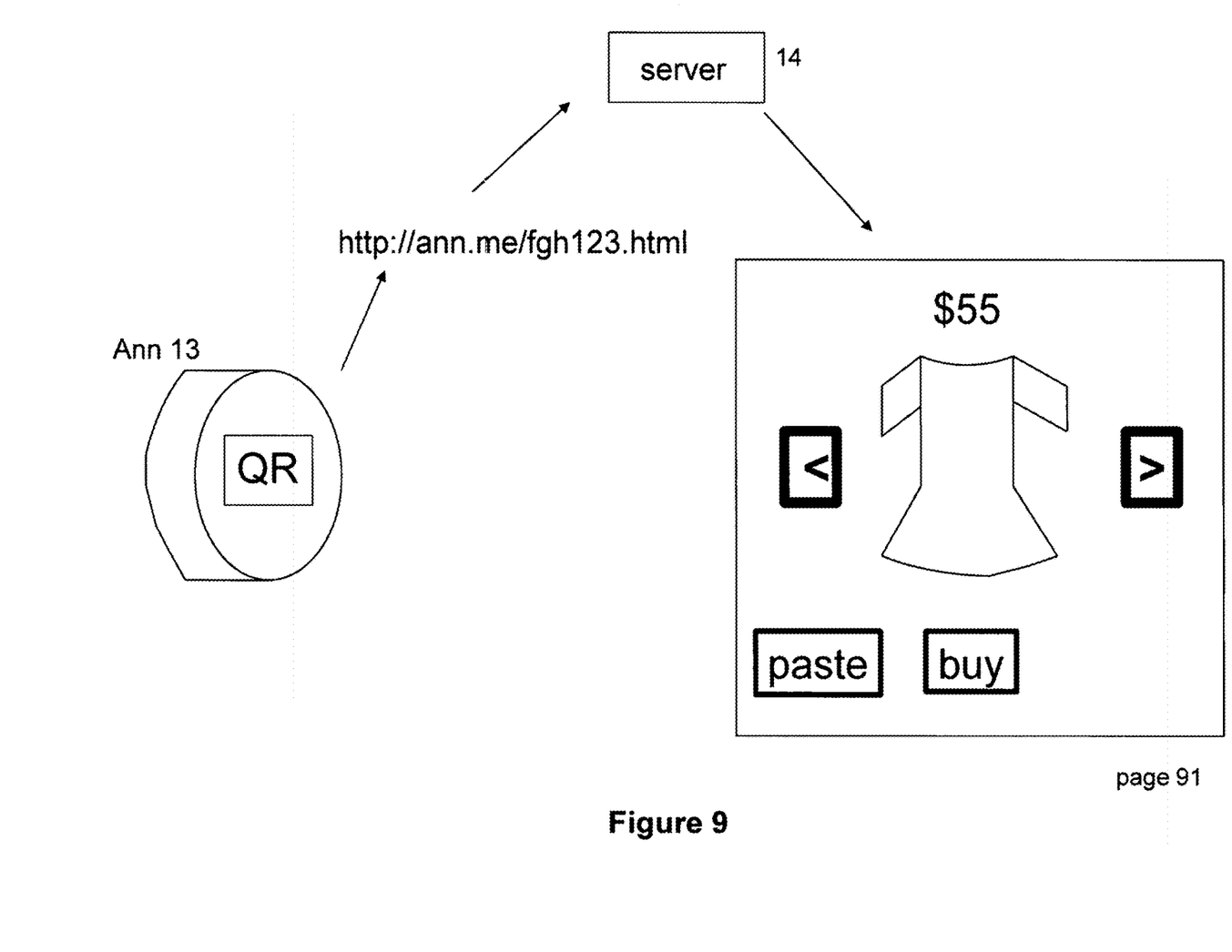
FIG. 9 shows a barcode on a digital assistant.

See FIG. 9. It shows Ann 13, where a barcode is printed on a flat surface of Ann. The barcode is a QR code, for example. Take the situation in Section 2, where Jane is talking and is interested in a dress. After some spoken back and forth, Ann says "decode my barcode". Jane has an app on a mobile device that can decode a QR code and, if the decoded data is an URL, it will start a mobile browser and load it with the URL.

FIG. 9 shows that the barcode decodes to http://ann.me/fgh123.html.

Suppose the domain ann.me is maintained by server 14, which is also Ann's server. Jane's browser sends the URL to server 14, which replies with page 91. Jane sees a picture of a dress costing $55. The page also shows buttons '<' and '>'. The '<' button means show the next dress on the left, and the '>' button means show the next dress on the right, where there might be a row of dresses and the page shows one dress at a time. A variant is where instead of the buttons, the page in the browser lets Jane swipe left or swipe right.

It is important to understand why FIG. 9 differs from the common use of printed barcodes to encode an URL. Those cases have an URL that typically goes to the home page or landing page of a website. The barcode is printed on a poster or hardcopy magazine page, for example. The thing that the barcode is printed on has no specific knowledge of the preferences of the user who takes a photo of the barcode with a mobile device. It cannot, because it, like a poster or magazine, has no computational ability.

Whereas the server has a map between the unique part of the URL—fgh123—and the network address of Ann. When Ann was installed in her present location by Tim, she booted up and called home to the server. That message had some unique id. The id might be fgh123. Or if not, then when Ann was made at a factory, a record was kept of the id and of the fgh123 printed on the barcode. So the id and fgh123 are related. For simplicity, we can take the id to be fgh123.

When Ann and Jane interacted by voice, the server knows that the instance of Ann is associated with fgh123. And the server knows that the context of the conversation is about dresses. Hence when the server gets the URL and extracts the id of fgh123, it infers the context and sends page 91.

More can be done. Once the server gets the URL from Jane's device, it gets the network address of her device from the Internet header. It can keep a record of this address and the last time it was used. It can set a timeout duration. So after that amount of time has passed and Jane has not sent any more requests, and then she sends a request from that network address, a different page 91 would be sent, declaring a timeout.

To reiterate what was said in an earlier section. When page 91 appears on Jane's device, she might be able to alter it by speaking to Ann. For example, Jane could say "right". Ann gets this and sends a command to the server equivalent to Jane pressing the '>' button.

What of case A in Section 0, where a user starts by having a page on a browser on his device and he wants to communicate the URL to Ann? Suppose this is Tim in Section 1. He scans the barcode. Another browser page appears on his device. This can be the default page when there is no pre-existing conversation between them. The page can have a text box, with a label "paste URL". Tim can copy and paste the URL of his other page into this box and hit return. This uploads the URL to server 14. Tim can start a conversation with Ann and ask her to do something with that URL and its page. Due to the simplicity of this page, an explicit figure of it is omitted.

Refer to FIG. 9. The paste button in it can be used. Suppose Jane also was doing something else on her browser. She wants Ann to analyse that browser page, but she was talking to Ann about dresses. Jane scans the barcode and gets page 91. She presses paste and gets the page described in the previous paragraph. Whereupon she pastes the URL for the page she is interested in.

The use of a barcode is an alternative to the various methods discussed earlier to cross the air gap between the digital assistant and the mobile device.

Instead of or in addition to the barcode, there might be an RFID tag or NFC transmitter on Ann. Encoding the URL. If the user's mobile device has an RFID detector or NRC receiver, then it could decode the URL. Functionally, matters proceed as earlier in this section.

11] Digital Assistant for a Social Interaction;

A digital assistant can also enable a social interaction between the user and other humans. Suppose Jane is near Ann, as in FIG. 4 or Section 2. Jane wants to play another person in a 2 person game. She asks Ann. By the sound mechanism of Section 2 or the barcode of the previous section, Jane gets a webpage on her phone. See FIG. 10. This shows 3 garners, with their photos and nicknames. The horizontal lines under the nicknames indicate that these are clickable. On the right are ratings of the players.

Figure 10:
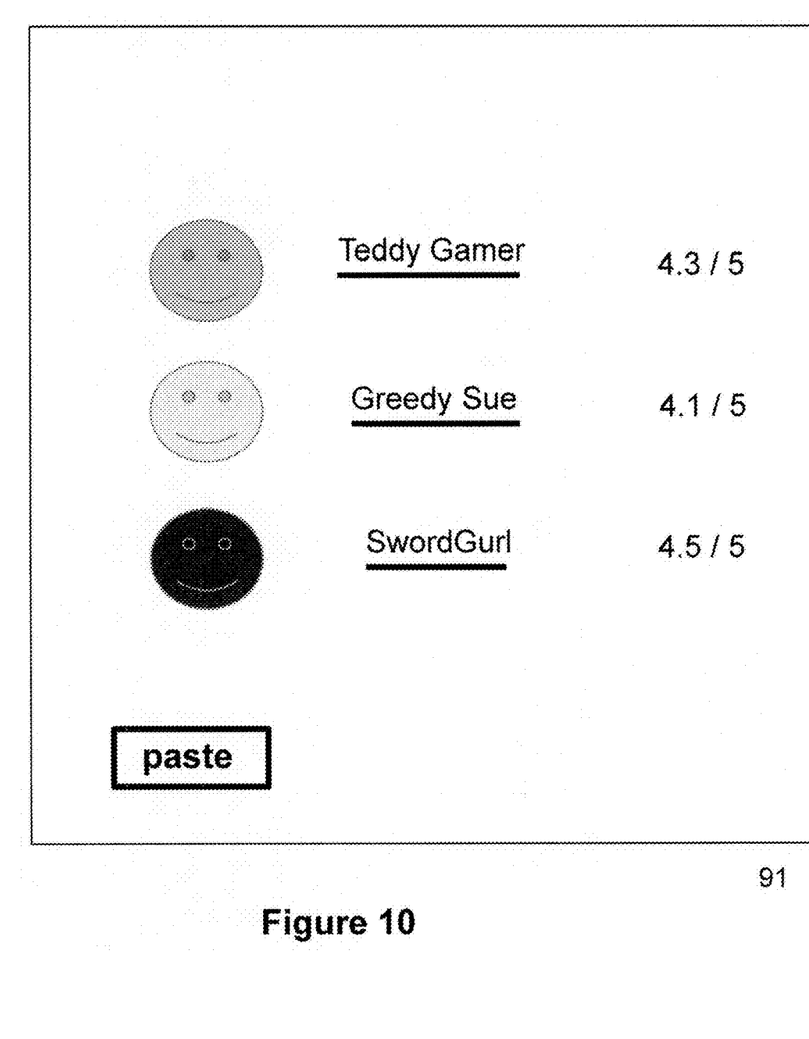
FIG. 10 shows a barcode enabled social interaction.

The paste button is as explained in the previous section. It lets Jane send an URL of a webpage to Ann.

The garners are all online right now, as found by Ann. So Jane can play any of them by clicking that person's nickname. Depending on what Jane asked Ann (the search criteria), the gamers might all be playing instances of the same game or they are playing different games. Suppose the latter.

If Jane picks Teddy Gamer, this is for chess, and the link is a normal URL, which takes Jane to a webpage where she plays him. But if she picks Greedy Sue, this installs and runs a game app (with Jane's permission) using a deep link. Jane's instance of the game will connect to Sue's instance, where Sue is at another place and at another network address. Similarly, picking SwordGurl will install a different game app and let Jane play her.

The nicknames are personal brands of the garners. When a nickname points to a deep link, we define the nickname as a Linket™ We have 9 US patents pending on linkets.

One search criterion could be proximity to Jane. This can let her socialise by meeting other garners in person. It is especially useful for social outdoors games, like Ingress™ and Pokemon Go™

Another useful aspect is that the digital assistant acts as a distribution mechanism for apps.

I claim:

1. A system of a digital assistant (DA) device and a server on the Internet;
the DA is configured to connect to the server;
the DA is configured to interact with a first mobile device;
the DA is configured to make audio output;
the DA is configured to receive audio from the first mobile device;
the DA is configured to decode the audio into a request;
the DA is configured to send the request to the server;
the server is configured to run the request to find a one or more deep links, wherein each of the one or more deep links contains an identifier of an application in a mobile app store, wherein each of the one or more deep links contains a network address of an instance of the application;

the server is configured to send the one or more deep links to the DA;

the DA is configured to transmit the one or more deep links as encoded audio;

the first mobile device is configured to decode the audio to extract the one or more deep links;

the first mobile device is configured to display the one or more deep links;

the first mobile device is configured to receive a selection of the one or more deep links from a user, wherein the first mobile device is configured to extract an application identifier from the selected deep link;

wherein, if the application is not on the first mobile device, installing, by the first mobile device, the application;

the first mobile device is configured to run the application as a scconq first instance, wherein the first instance connects to the network address extracted from the selected deep link, wherein the first instance interacts with a second application instance at the network address.

2. The system of claim 1, wherein the request has a proximity requirement; the server is configured to find deep links associated with mobile devices within the given proximity of the first mobile device.

* * * * *

UNITED STATES PATENT AND TRADEMARK OFFICE
CERTIFICATE OF CORRECTION

PATENT NO. : 10,672,066 B2  
APPLICATION NO. : 15/530733  
DATED : June 2, 2020  
INVENTOR(S) : Wesley Boudville Page 1 of 1

It is certified that error appears in the above-identified patent and that said Letters Patent is hereby corrected as shown below:

In the Claims

Column 15, Line 17. Please delete "scconq"

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*